United States Patent
Bennett et al.

(10) Patent No.: US 8,385,703 B2
(45) Date of Patent: Feb. 26, 2013

(54) HIGH NUMERICAL APERTURE MULTIMODE OPTICAL FIBER

(75) Inventors: Kevin Wallace Bennett, Hammondsport, NY (US); Scott Robertson Bickham, Corning, NY (US); James A Derick, Big Flats, NY (US); Percil Watkins, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 231 days.

(21) Appl. No.: 13/035,341

(22) Filed: Feb. 25, 2011

(65) Prior Publication Data
US 2011/0217011 A1  Sep. 8, 2011

Related U.S. Application Data

(60) Provisional application No. 61/309,660, filed on Mar. 2, 2010.

(51) Int. Cl.
*G02B 6/02* (2006.01)
*G02B 6/028* (2006.01)
*G02B 6/032* (2006.01)

(52) U.S. Cl. ......... 385/124; 385/123; 385/126; 385/127

(58) Field of Classification Search .................. None
See application file for complete search history.

(56) References Cited

U.S. PATENT DOCUMENTS

| | | | |
|---|---|---|---|
| 4,053,679 A | 10/1977 | Rinehart | |
| 4,055,703 A | 10/1977 | Rinehart | |
| 5,895,768 A | 4/1999 | Speit | |
| 6,518,211 B1 | 2/2003 | Bradshaw et al. | |
| 7,285,509 B2 | 10/2007 | Bayya et al. | |
| 7,321,711 B2* | 1/2008 | Kumano | 385/123 |
| 7,482,296 B2 | 1/2009 | Messerschmidt et al. | |
| 7,526,169 B2* | 4/2009 | Bickham et al. | 385/127 |
| 7,787,731 B2* | 8/2010 | Bookbinder et al. | 385/124 |
| 7,903,917 B2* | 3/2011 | Bickham et al. | 385/124 |
| 7,903,918 B1* | 3/2011 | Bickham et al. | 385/124 |
| 8,189,978 B1* | 5/2012 | Bennett et al. | 385/127 |
| 8,297,854 B2* | 10/2012 | Bickham et al. | 385/78 |
| 2003/0210878 A1* | 11/2003 | Kumano et al. | 385/127 |
| 2008/0056654 A1* | 3/2008 | Bickham et al. | 385/124 |
| 2008/0056658 A1* | 3/2008 | Bickham et al. | 385/127 |
| 2008/0063349 A1* | 3/2008 | Kumano et al. | 385/127 |
| 2008/0124028 A1* | 5/2008 | Bickham et al. | 385/55 |
| 2008/0166094 A1* | 7/2008 | Bookbinder et al. | 385/124 |

(Continued)

FOREIGN PATENT DOCUMENTS

EP  0177206 A1  4/1986

OTHER PUBLICATIONS

L. Calvez, M. Roze, H.L. Ma, J.C. Sangleboeuf, Jean-Pierre Guin, X.H. Zhang, "Strengthening of chalco-halide glasses by ion exchange", Journal of Non-oxide and Photonic Glasses, vol. 1, No. 1, 2009, pp. 30-37.

(Continued)

*Primary Examiner* — Rhonda Peace
(74) *Attorney, Agent, or Firm* — Robert L. Carlson

(57) ABSTRACT

Multimode optical fibers with a large core diameter and high numerical aperture are disclosed herein. Multimode optical fibers disclosed herein comprise a core region having a radius greater than 30 microns and a cladding region surrounding and directly adjacent to the core region, the cladding region comprising a depressed-index annular portion comprising a depressed relative refractive index. The depressed cladding region is surrounded by a titania doped cladding region. The fiber has a total outer diameter of less than 120 microns, and exhibits an overfilled bandwidth at 850 nm greater than 200 MHz-km.

22 Claims, 4 Drawing Sheets

U.S. PATENT DOCUMENTS

| | | |
|---|---|---|
| 2008/0226246 A1* | 9/2008 | Imamura .................... 385/127 |
| 2008/0273850 A1* | 11/2008 | Imamura .................... 385/126 |
| 2008/0279517 A1* | 11/2008 | Bickham et al. ............ 385/124 |
| 2008/0292257 A1* | 11/2008 | Kumano et al. ............. 385/127 |
| 2008/0310807 A1* | 12/2008 | Imamura .................... 385/127 |
| 2009/0154888 A1* | 6/2009 | Abbott et al. ............... 385/124 |
| 2009/0169163 A1* | 7/2009 | Abbott et al. ............... 385/127 |
| 2009/0215607 A1 | 8/2009 | Dejneka et al. |
| 2009/0263662 A1 | 10/2009 | Shelestak et al. |
| 2010/0046899 A1* | 2/2010 | Bickham et al. ............ 385/124 |
| 2010/0272406 A1* | 10/2010 | Bookbinder et al. ........ 385/124 |
| 2011/0064368 A1* | 3/2011 | Bookbinder et al. ........ 385/123 |
| 2011/0217011 A1* | 9/2011 | Bennett et al. .............. 385/124 |

OTHER PUBLICATIONS

V.V. Moiseev, "Ion exchange and constitution of glass", Journal of Non-Crystalline Solids, vol. 42, Issues 1-3, Oct. 1980, pp. 589-600.

* cited by examiner

US 8,385,703 B2

HIGH NUMERICAL APERTURE MULTIMODE OPTICAL FIBER

CROSS-REFERENCE TO RELATED APPLICATIONS

This application claims the benefit of priority under 35 U.S.C. §119(e) of U.S. Provisional Application Ser. No. 61/309,660 filed on Mar. 2, 2010.

FIELD OF THE INVENTION

The present invention relates generally to optical fibers, and more specifically to multimode optical fibers.

TECHNICAL BACKGROUND

Corning Incorporated manufactures and sells InfiniCor® 62.5 µm optical fiber, which is multimode optical fiber having a core with a maximum relative refractive index delta of about 2% and 62.5 µm core diameter, as well as InfiniCor® 50 µm optical fiber, which is multimode optical fiber having a core with a maximum relative refractive index delta of about 1% and 50 µm core diameter. Corning also manufactured 100/140 CPC3 Multimode Fiber, which is a graded index optical fiber with a 100 µm core diameter, a 140 µm undoped silica cladding diameter and a numerical aperture of 0.29.

SUMMARY OF THE INVENTION

Multimode optical fibers with a large core diameter and high numerical aperture are disclosed herein. Multimode optical fibers disclosed herein comprise a graded-index core region having a core radius greater than 30 microns and a cladding region surrounding the core region, the cladding region may comprise a depressed-index annular cladding region which is depressed relative to another portion of the cladding. The depressed index cladding region may preferably be directly adjacent the core. A titania doped cladding region surrounds the cladding region. The titania may be present in an amount greater than 5 wt percent, more preferably greater than 8 wt percent, and may be greater than 10 wt percent. The titania doped region has a width of between 1 and 5 microns. The fiber preferably has a total outer diameter of less than 120 microns, and may exhibit an overfilled bandwidth at 850 nm greater than 200 MHz-km.

The core of the fiber is preferably glass, and the depressed index annular region and any cladding regions may also be glass. The depressed-index annular cladding region preferably has a refractive index delta less than about −0.1 and a width of at least 1 micron, more preferably a refractive index delta less than about −0.2 and a width of at least 2 microns. The depressed-index annular cladding region is preferably directly adjacent to the core. However, the depressed-index annular cladding region may be spaced from the core, for example by an amount less than 4 microns, more preferably by 1 to 4 microns. Such optical fibers which are disclosed herein are capable of exhibiting an overfilled bandwidth at 850 nm which is greater than 200 MHz-km. The fibers disclosed herein preferably comprise an outermost glass diameter of less than 120 microns, more preferably less than 110 microns.

Preferably, the refractive index profile of the core has a parabolic or substantially parabolic shape. The depressed-index annular portion may, for example, comprise glass comprising a plurality of voids, or glass doped with a downdopant such as fluorine, boron or mixtures thereof, or glass doped with one or more of such downdopants and additionally glass comprising a plurality of voids. In some preferred embodiments, the depressed-index annular portion is comprised of fluorine doped silica glass. In some embodiments, the depressed-index annular portion has a refractive index delta less than about −0.2% and a width of at least 1 micron, more preferably less than about −0.3% and a width of at least 2 microns.

In some embodiments that comprise a cladding with voids, the voids in some preferred embodiments are non-periodically located within the depressed-index annular portion. By "non-periodically located", we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. It is believed that the voids extend along the length of the fiber a distance less than 20 meters, more preferably less than 10 meters, even more preferably less than 5 meters, and in some embodiments less than 1 meter.

The multimode optical fiber disclosed herein exhibits very low bend induced attenuation, in particular very low macrobending induced attenuation. Consequently, the multimode optical fiber may comprise a graded index glass core; and a second cladding comprising a depressed-index annular portion surrounding the core, said depressed-index annular portion having a refractive index delta less than about −0.2% and a width of at least 1 micron, more preferably less than about −0.3% and a width of at least 2 microns, wherein the fiber further exhibits an 0.5 turn 3 mm diameter mandrel wrap attenuation increase, of less than or equal to 0.5 dB/turn at 850 nm, a numerical aperture of greater than 0.24, more preferably greater than 0.26, and most preferably greater than 0.28 and an overfilled bandwidth greater than 200 MHz-km at 850 nm, more preferably greater than 500 MHz-km at 850 nm, even more preferably greater than 700 MHz-km at 850 nm, and most preferably greater than 1000 MHz-km at 850 nm.

Using the designs disclosed herein, 60 micron or greater (e.g., greater than 70 microns, or greater than 75 microns) diameter core multimode fibers can been made which provide (a) an overfilled (OFL) bandwidth of greater than 200 MHz-km at 850 nm, more preferably greater than 500 MHz-km at 850 nm, even more preferably greater than 700 MHz-km at 850 nm, and most preferably greater than 1000 MHz-km at 850 nm. These high bandwidths can be achieved while still maintaining an 1×180° turn 3 mm diameter mandrel wrap attenuation increase at a wavelength of 850 nm, of less than 1.0 dB, more preferably less than 0.5 dB, even more preferably less than 0.3 dB, and most preferably less than 0.2 dB. These high bandwidths can also be dB. Such fibers achieved while also maintaining a 2×90° turn 4 mm diameter mandrel wrap attenuation increase at a wavelength of 850 nm, of less than 0.2 dB, more preferably less than 0.1 dB, and most preferably less than 0.05 dB. These bend losses and bandwidths are achieved both when the input signal is aligned with the center of the fiber, as well as when the input signal is launched with an offset of 5 or even 10 µm relative to the center of the fiber. Such fibers are further capable of providing a numerical aperture (NA) greater than 0.24, more preferably greater than 0.26, and most preferably greater than 0.28. Such fibers are further simultaneously capable of exhibiting an OFL bandwidth at 1300 nm which is greater than 200 MHz-km, preferably greater than 500 MHz-km, more preferably greater than 1000 MHz-km.

Preferably, the multimode optical fiber disclosed herein exhibits a spectral attenuation of less than 5.0 dB/km at 850 nm, preferably less than 4.0 dB/km at 850 nm, even more preferably less than 3.5 dB/km at 850 nm and still more preferably less than 3.0 dB/km at 850 nm. Preferably, the multimode optical fibers disclosed herein exhibit a spectral attenuation of less than 1.5 dB/km at 1300 nm, preferably less than 1.0 dB/km at 1300 nm, even more preferably less than 0.8 dB/km at 1300 nm. It may be desirable to spin the multimode fiber, as doing so may in some circumstances further improve the bandwidth for optical fiber having a depressed cladding region. By spinning, we mean applying or imparting a spin to the fiber wherein the spin is imparted while the fiber is being drawn from an optical fiber preform, i.e. while the fiber is still at least somewhat heated and is capable of undergoing non-elastic rotational displacement and is capable of substantially retaining the rotational displacement after the fiber has fully cooled.

The numerical aperture (NA) of the optical fibers disclosed herein are preferably less than 0.32 and greater than 0.18, more preferably greater than 0.2, even more preferably less than 0.32 and greater than 0.24, and most preferably less than 0.30 and greater than 0.24.

The core may be designed to extend radially outwardly from the centerline to a radius R1, R1≧30 microns, more preferably R1≧35 microns, and in some cases R1≧40 microns. The core may be designed to have R1≦50 microns, and preferably R1≦45 microns.

The core may be designed to have a maximum relative refractive index, less than or equal to 3.0% and greater than 0.5%, more preferably less than 2.5% and greater than 0.9%, most preferably less than 2.2% and greater than 1.2%. The core may have a maximum refractive index between 1.6 and 2.0%.

Optical fibers disclosed herein are capable of exhibiting a 1×180° turn 3 mm diameter mandrel attenuation increase of no more than 1.0 dB, preferably no more than 0.5 dB, more preferably no more than 0.3 dB, and most preferably no more than 0.2 dB, at all wavelengths between 800 and 1400 nm.

The multimode optical fibers disclosed herein may comprise a graded-index glass core, disposed about a longitudinal centerline, and a glass cladding surrounding the core. The cladding comprises a depressed-index annular portion, and an outer annular portion. The depressed-index annular portion preferably directly abuts the core, and in some embodiments, the outer annular portion preferably comprises undoped silica cladding, although in other embodiments the depressed annular portion may extend to the outermost glass diameter of the optical fiber. All refractive indices set forth herein are in reference to the outer annular portion as described below.

The fibers disclosed herein are capable of being multimoded at the conventional operating wavelengths for such telecommunications fibers, i.e., at least over the wavelength range extending from 850 nm to 1300 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
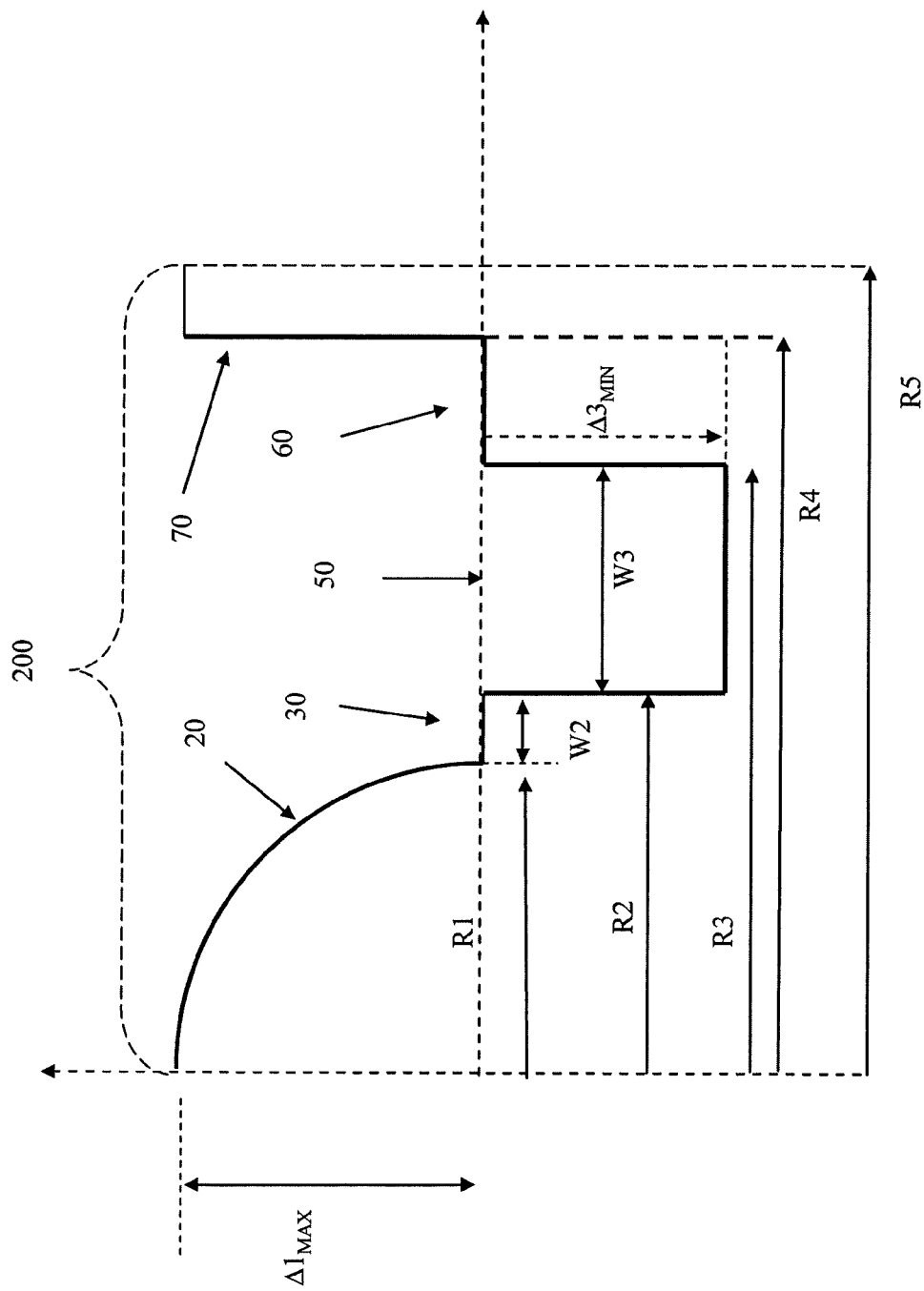
FIG. 1 shows a schematic representation (not to scale) of the refractive index profile of a cross-section of the glass portion of an exemplary embodiment of multimode optical fiber disclosed herein wherein the depressed-index annular portion is offset from the core and is surrounded by an outer annular cladding portion.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 850 nm unless otherwise specified. Unless otherwise specified herein, $n_{REF}$ is the refractive index of undoped silica glass, i.e. 1.4525 at 850 nm.

As used herein, the relative refractive index is represented by Δ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Unless otherwise noted, macrobend performance was determined according to FOTP-62 (IEC-60793-1-47) by wrapping 1 turn around either a 2 mm, 3 mm, or 10 mm or similar diameter mandrel for the prescribed number of turns or degrees (e.g. "1×10 mm diameter macrobend loss" or the "1×180° turn 3 mm diameter macrobend loss") and measuring the increase in attenuation due to the bending using an overfilled launch condition where the optical source has a spot size that is greater than 50% of the core diameter of the fiber under test. In some measurements, an encircled flux launch (EFL) macrobend performance was obtained by launching an overfilled pulse into an input end of a 2 m length of InfiniCor® 50 μm optical fiber which was deployed with a 1×25 mm diameter mandrel near the midpoint. The output end of the InfiniCor® 50 μm optical fiber was spliced to the fiber under test, and the measured bend loss is the ratio of the attenuation under the prescribed bend condition to the attenuation without the bend.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture".

The term "α-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_1-r_o)]^\alpha),$$

where $r_o$ is zero unless otherwise specified, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The depressed-index annular portion has a profile volume, $V_3$, defined herein as:

$$2\int_{R_{INNER}}^{R_{OUTER}} \Delta_3(r)rdr$$

where $R_{INNER}$ is the depressed-index annular portion inner radius and $R_{OUTER}$ is the depressed-index annular portion outer radius as defined. For the fibers disclosed herein, the absolute magnitude of $V_3$ is preferably greater than 120%-μm², more preferably greater than 160%-μm², and even more preferably greater than 200%-μm². Preferably the absolute magnitude of $V_3$ is less than 400%-μm², more preferably less than 350%-μm². In some preferred embodiments, the absolute magnitude of $V_3$ is greater than 120%-μm² and less than 350%-μm². In other preferred embodiments, the absolute magnitude of $V_3$ is greater than 160%-μm² and less than 300%-μm².

Multimode optical fiber disclosed herein comprises a core and a cladding surrounding and directly adjacent the core. In some embodiments, the core comprises silica doped with germanium, i.e. germania doped silica. Dopants other than germanium such as $Al_2O_3$ or $P_2O_5$, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

Figure 2:
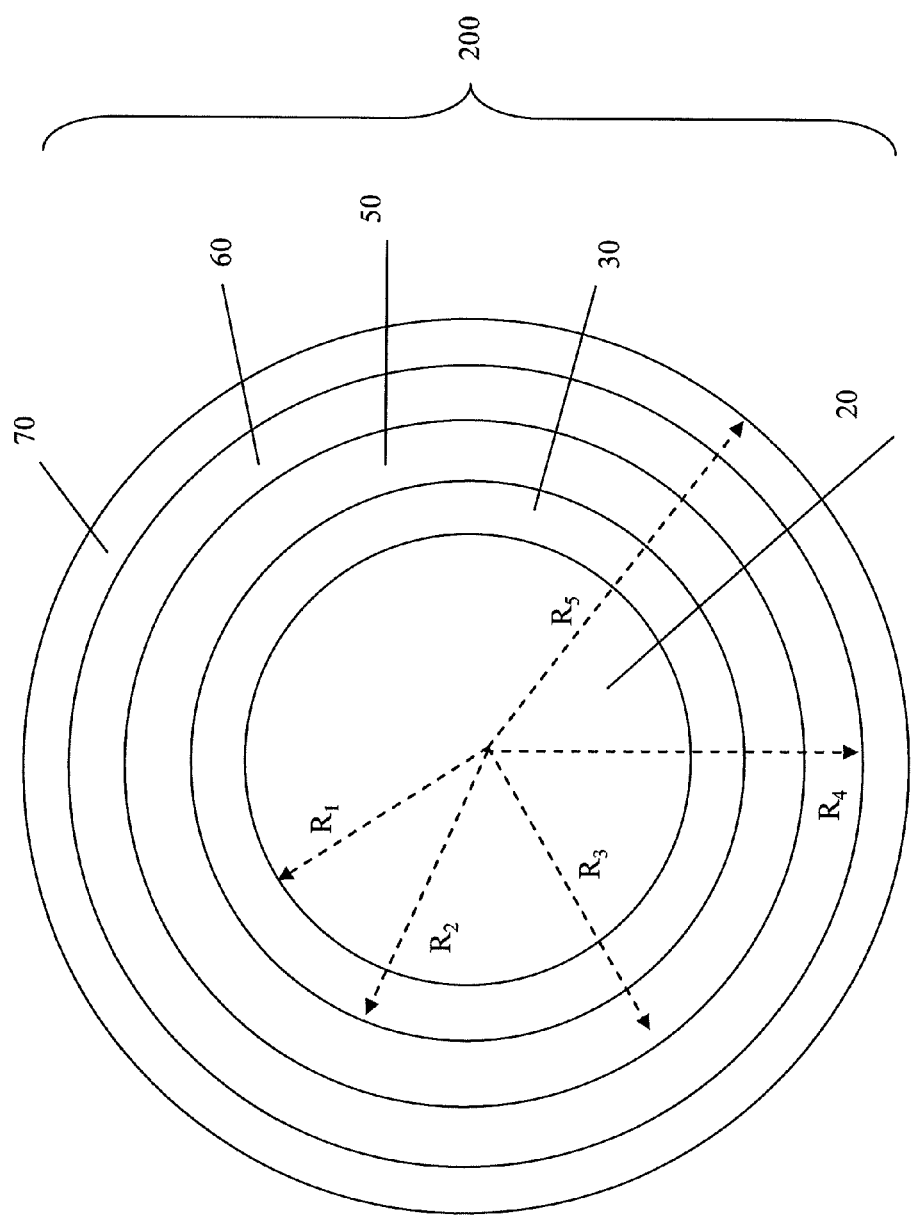
FIG. 2 is a schematic representation (not to scale) of a cross-sectional view of the optical waveguide fiber of FIG. 1.

FIG. 1 illustrates a schematic representation of the refractive index profile of a cross-section of the glass portion of one exemplary embodiment of a multimode optical fiber comprising a glass core 20 and a glass cladding 200, the cladding comprising an inner annular portion 30, a depressed-index annular portion 50, outer annular portion 60, and titania doped outer cladding portion 70. FIG. 2 is a schematic representation (not to scale) of a cross-sectional view of the optical waveguide fiber of FIG. 1. The core 20 has outer radius $R_1$ and maximum refractive index delta $\Delta 1_{MAX}$. The inner annular portion 30 is comprised of refractive index delta $\Delta 2$ and has width $W_2$ and outer radius $R_2$. Depressed-index annular portion 50 has minimum refractive index delta percent $\Delta 3_{MIN}$, width $W_3$ and outer radius $R_3$. The depressed-index annular portion 50 is shown offset, or spaced away, from the core 20 by the inner annular portion 30. In preferred embodiments, the width of inner annular portion 30 may be less than 4.0 microns.

In the embodiment illustrated in FIG. 1, the depressed index annular portion 50 surrounds inner annular portion 30, and the outer annular cladding portion 60 surrounds and preferably contacts annular portion 50, and titania doped outer cladding portion 70 surrounds and preferably contacts outer annular cladding portion 60. Preferably, the titania in titania doped outer cladding portion 70 may be present in an amount greater than 5 wt percent, more preferably greater than 8 wt percent, and may be greater than 10 wt percent. The titania doped region has a width of between 1 and 5 microns. The inner annular portion 30 has a refractive index profile $\Delta 2(r)$ with a maximum relative refractive index $\Delta 2_{MAX}$, and a minimum relative refractive index $\Delta 2_{MIN}$, where in some embodiments $\Delta 2_{MAX} = \Delta 2_{MIN}$. The depressed-index annular portion 50 has a refractive index profile $\Delta 3(r)$ with a minimum relative refractive index $\Delta 3_{MIN}$. The outer annular portion 60 comprises relative refractive index $\Delta 4$. Preferably, $\Delta 1 > \Delta 4 > \Delta 3$, and in the embodiment illustrated in FIG. 1, $\Delta 1 > \Delta 2 > \Delta 3$. In some embodiments, the inner annular portion 30 has a substantially constant refractive index profile, as shown in FIG. 1 with a constant $\Delta 2(r)$; in some of these embodiments, $\Delta 2(r) = 0\%$. In some embodiments, the outer annular portion 60 has a substantially constant refractive index profile, as shown in FIG. 1 with a constant $\Delta 4(r)$; in some of these embodiments, $\Delta 4(r) = 0\%$. Preferably, the core contains substantially no fluorine, and preferably the core contains no fluorine. In some embodiments, the inner annular portion 30 preferably has a relative refractive index profile $\Delta 2(r)$ having a maximum absolute magnitude less than 0.05%, and $\Delta 2_{MAX} < 0.05\%$ and $\Delta 2_{MIN} > -0.05\%$, and the depressed-index annular portion 50 begins where the relative refractive index of the cladding first reaches a value of less than −0.05%, going radially outwardly from the centerline. In some embodiments, the outer annular portion 60 has a relative refractive index profile $\Delta 4(r)$ having a maximum absolute magnitude less than 0.05% and greater than −0.05%.

The outer diameter of the glass portion of the optical fiber is preferably less than 120 μm, more preferably less than 110 μm, even more preferably less than or equal to about 100 μm. Thus, in the embodiment illustrated in FIG. 1, the outer cladding diameter (2×$R_4$) is preferably less than 120 μm, more preferably less than 110 μm, even more preferably less than 100 μm. In some embodiments, the core diameter (2×$R_1$) is between 35 and 45 μm, more preferably 37 and 43 μm, and the outer cladding diameter $R_4$ is between 45 and 55 μm, more preferably between 47 and 53 μm. In some preferred embodiments, the outer cladding region 60 has a width less than 15 μm, more preferably less than 10 μm, most preferably less than 7 μm.

In the multimode optical fiber disclosed herein, the core is a graded-index core, and preferably, the refractive index profile of the core has a parabolic (or substantially parabolic) shape; for example, the refractive index profile of the core may have an α-shape with an α value preferably between 1.9 and 2.3, more preferably about 2.1, as measured at 850 nm Alternatively, the refractive index profile of the core may have an α-shape with an α value preferably between 1.9 and 2.1, more preferably about 2.0, as measured at 850 nm. In some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. The parabolic shape extends to a radius $R_1$ and preferably extends from the centerline of the fiber to $R_1$. As used herein, "parabolic" therefore includes substantially parabolically shaped refractive index profiles which may vary slightly from an α value of about 2.0, for example 1.9, 2.1 or 2.3, at one or more points in the core, as well as profiles with minor variations and/or a centerline dip. Referring to the Figures, the core 20 is defined to end at the radius $R_1$ where the parabolic core shape ends, coinciding with the innermost radius of the cladding 200.

Preferably, the optical fiber disclosed herein has a silica-based glass core and cladding. One or more portions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may be surrounded by at least one coating 210, which may in some embodiments comprise a low modulus primary coating and a high modulus secondary coating. The coating can be a polymer coating such as an acrylate-based polymer.

In some embodiments, the depressed-index annular portion comprises voids, either non-periodically disposed, or periodically disposed, or both By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. As used herein, the diameter of a hole is the longest line segment whose endpoints are disposed on the silica internal surface defining the hole when the optical fiber is viewed in perpendicular cross-section transverse to the longitudinal axis of the fiber.

In some embodiments, the inner annular portion 30 comprises silica which is substantially undoped with either fluorine or germania. Preferably, the annular portion 30 comprises a width of less than 4.0 microns, more preferably less than 2.0 microns. In some embodiments, the outer annular portion 60 comprises substantially undoped silica, although the silica may contain some amount of chlorine, fluorine, germania, or other dopants in concentrations that collectively do not significantly modify the refractive index. The depressed-index annular portion 50 may comprise silica doped with fluorine and/or boron. Alternatively, the depressed-index annular portion 50 may comprise silica comprising a plurality of non-periodically disposed voids. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 50 is lowered due to the presence of the voids. The voids can be randomly or non-periodically disposed in the annular portion 50 of the cladding 200, and in other embodiments, the voids are disposed periodically in the annular portion 50. Alternatively, or in addition, the depressed index in annular portion 50 can also be provided by downdoping the annular portion 50 (such as with fluorine) or updoping one or more portions of the cladding and/or the core, wherein the depressed-index annular portion 50 is, for example, silica which is not doped as heavily as the inner annular portion 30. Preferably, the minimum relative refractive index, or average effective relative refractive index, such as taking into account the presence of any voids, of the depressed-index annular portion 50 is preferably less than −0.1%, more preferably less than about −0.2 percent, even more preferably less than about −0.3 percent, and most preferably less than about −0.4 percent.

The titania doped outer cladding layer 70 may be formed using conventional outside vapor deposition (OVD) processes. For example, the soot deposition process may employ one or more passes of $TiO_2$—$SiO_2$ soot layers, for example at the end of a conventional OVD soot laydown process. $TiCl_4$ and $SiCl_4$ vapors may be provided to the OVD burner by a reactant delivery system to thereby deposit the titania-silica soot.

The use of a titania outer cladding layer 70 can result in improved dynamic fatigue resistance, described herein as dynamic fatigue value n. For example, it is possible to achieve dynamic fatigue values higher than 25, 30, and even 40 using titania doped outer cladding layers 70.

In this patent application, it is assumed that fracture mechanics applies to flaws in glass optical fibers: namely, that the stress intensity factor, $K_I$, is related to the applied tensile stress, $\sigma_a$, and flaw depth, a, by $$K_I = 0.73 \sigma_a (\pi a)^{1/2} \tag{1}$$

When $K_I$ reaches the fracture toughness, $K_I = K_{Ic}$, failure occurs and the above equation can be rearranged to give strength, $\sigma_f$, as a function of crack depth, a, $$\sigma_f = K_{IC}/0.73(\pi a)^{1/2} \tag{2}$$

It is also assumed that the power law crack velocity model describes the relationship between crack velocity and stress intensity factor by, $$V = A K_{In} \quad (3)$$

where A and n are crack growth parameters. The crack growth parameter n is of particular value in that it gives a measure of a material's susceptibility to subcritical crack growth. For optical fibers n is often measured using the dynamic fatigue technique where fiber strength, $\sigma_f$, is measured as a function of stress rate, $\sigma_r$, where $$\left(\frac{\sigma_{f1}}{\sigma_{f2}}\right)^{n+1} = \left(\frac{\sigma_{r1}}{\sigma_{r2}}\right)$$

The subscripts 1 and 2 indicate different measured strengths for different rates of stress. The value for n is determined by simple regression of log strength versus log stress rate where the slope is equal to 1/(n+1). For a general discussion of the measurement of fatigue resistance n value, see Glaesemann, Jakus, and Ritter, "Strength Variability of Indented Soda-Lime Glass", Journal of the American Ceramic Society, Vol. 70, No. 6, June 1987, pp. 441-444.

For the n values given herein, fiber strength was measured in 100% relative humidity at approximately 25° C. using 20 meter gauge lengths. The stress rates used correspond to strain rates of 4 and 0.004%/min. The standard deviation of the slope {1/(n+1)} was typically 10% of the mean for the n values reported herein. A similar, but not as exhaustive, dynamic fatigue test technique is given in E.I.A. test procedure FOTP-76. Strength data set forth herein (as opposed to fatigue resistance data) were measured with the 4%/min. strain rate under the above environmental conditions.

Figure 3:
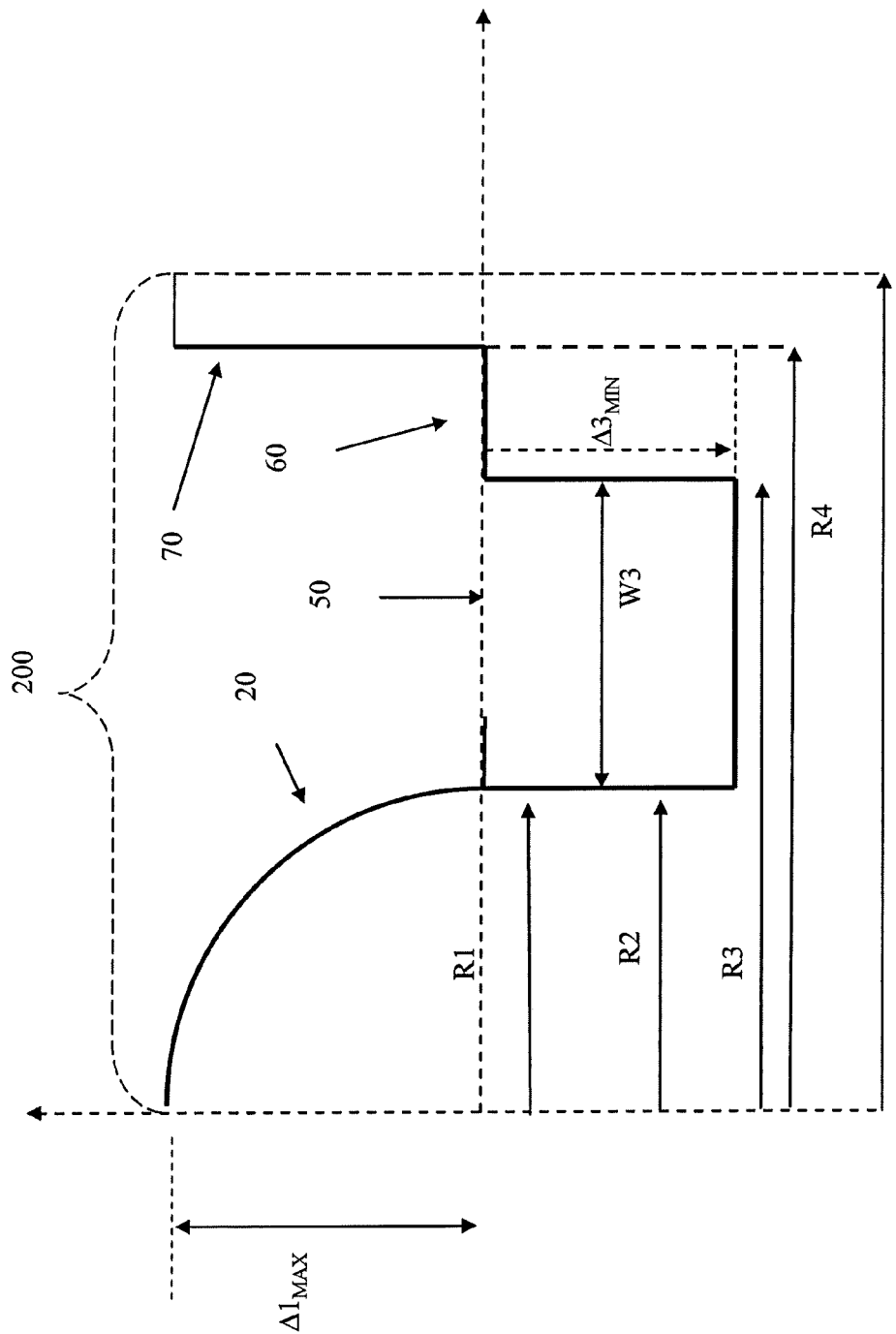
FIG. 3 shows a schematic representation (not to scale) of the refractive index profile of a cross-section of the glass portion of an exemplary embodiment of multimode optical fiber disclosed herein wherein the depressed-index annular portion is not offset from the core and is surrounded by an outer annular cladding portion.
Figure 4:
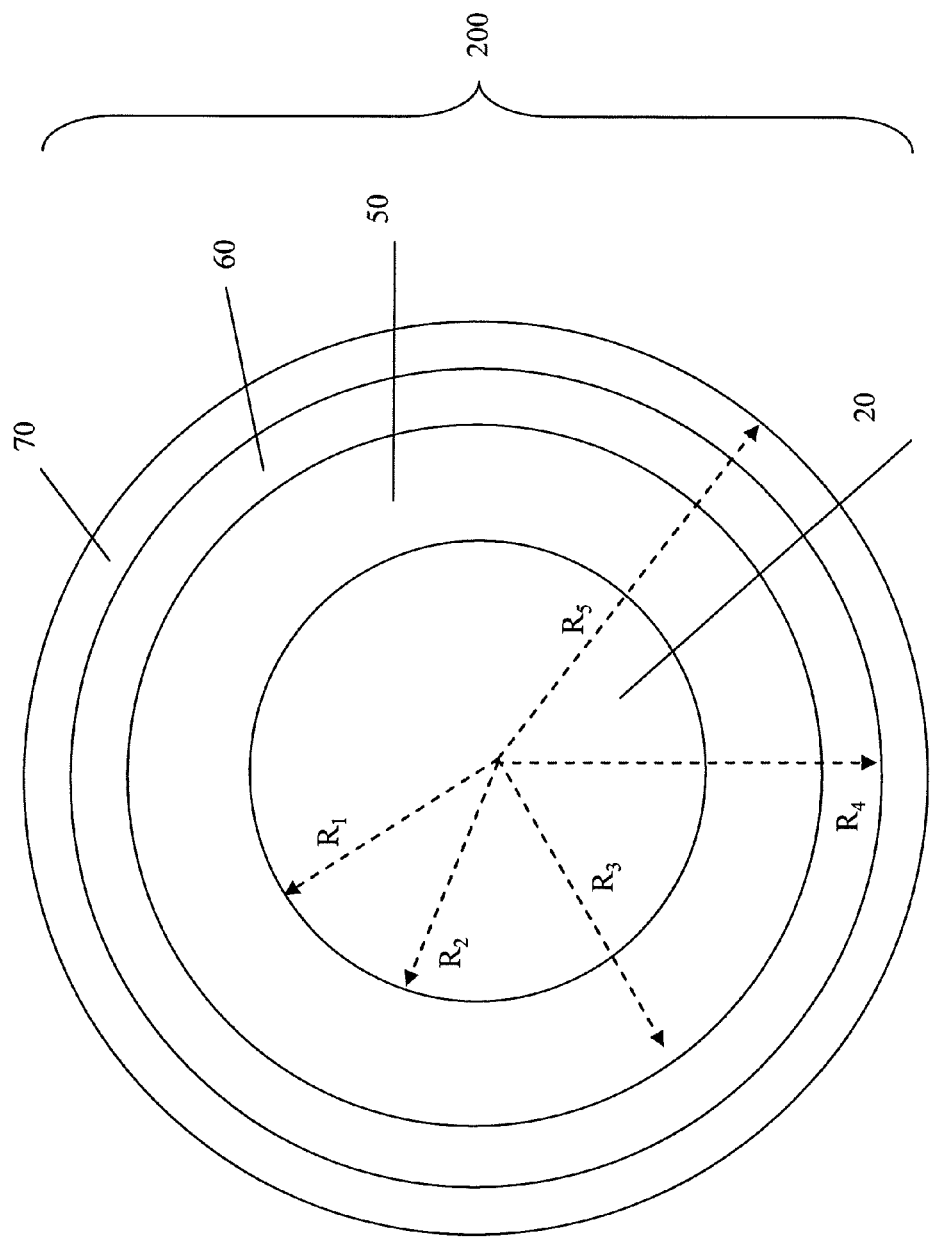
FIG. 4 is a schematic representation (not to scale) of a cross-sectional view of the optical waveguide fiber of FIG. 3.

FIG. 3 illustrates a schematic representation of the refractive index profile of a cross-section of the glass portion of an alternative exemplary embodiment of a multimode optical fiber comprising a glass core 20 and a glass cladding 200, the cladding comprising a depressed-index annular portion 50, an outer annular portion 60, and titania doped outer cladding portion 70. Preferably, the titania in titania doped outer cladding portion 70 may be present in an amount greater than 5 wt percent, more preferably greater than 8 wt percent, and may be greater than 10 wt percent. The titania doped region has a width of between 1 and 5 microns. FIG. 4 is a schematic representation (not to scale) of a cross-sectional view of the optical waveguide fiber of FIG. 3. The core 20 has outer radius $R_1$ and maximum refractive index delta $\Delta 1_{MAX}$. The depressed-index annular portion 50 has minimum refractive index delta percent $\Delta 3_{MIN}$, width $W_3$ and outer radius $R_3$. The depressed-index annular portion 50 surrounds and is in direct contact with the core 20, i.e., there is no inner cladding region 30 (having $\Delta 2$) between the core 20 and the depressed-index annular portion 50. Preferably, $\Delta 1 > \Delta 4 > \Delta 3$. The outer annular portion 60 surrounds and contacts depressed-index annular portion 50. The depressed-index annular portion 50 has a refractive index profile $\Delta 3(r)$ with a minimum relative refractive index $\Delta 3_{MIN}$. The outer annular portion 60 has a refractive index profile $\Delta 4(r)$ with a maximum relative refractive index $\Delta 4_{MAX}$, and a minimum relative refractive index $\Delta 4_{MIN}$, where in some embodiments $\Delta 4_{MAX} = \Delta 4_{MIN}$. Preferably, $\Delta 1_{MAX} > \Delta 3_{MIN}$. Preferably, the core is doped with germania and contains substantially no fluorine, more preferably the core contains no fluorine. The depressed-index annular portion 50 begins where the relative refractive index of the cladding first reaches a value of −0.05%, going radially outwardly from the centerline. In some embodiments, the outer annular portion 60 has a relative refractive index profile $\Delta 4(r)$ having a maximum absolute magnitude less than 0.05%, and $\Delta 4_{MAX} < 0.05\%$ and $\Delta 4_{MIN} > -0.05\%$, and the depressed-index annular portion 50 ends where the region of relatively constant refractive index ($\Delta 4$) begins.

An alternative exemplary embodiment of a multimode optical fiber comprises a glass core 20 and a glass cladding 200 comprising an outer annular portion 60, and titania doped outer cladding portion 70. In some embodiments, annual portion 60 has a relative refractive index profile $\Delta 4(r)$ with a maximum absolute magnitude less than 0.05%, and $\Delta 4_{MAX} < 0.05\%$ and $\Delta 4_{MIN} > -0.05\%$. In some of these embodiments, the annual portion 60 is comprised substantially of pure silica, In other embodiments annular portion 60 comprises fluorine, germanium and/or cholorine such that the relative refractive index profile $\Delta 4(r)$ has a maximum absolute magnitude less than 0.05%. In other embodiments, annual portion 60 is doped such that the refractive index relative to silica is less than about −0.1, more preferably less than about −0.2. Preferably, the titania in titania doped outer cladding portion 70 may be present in an amount greater than 5 wt percent, more preferably greater than 8 wt percent, and may be greater than 10 wt percent. The titania doped region has a width of between 1 and 5 microns. The core 20 has outer radius $R_1$ and maximum refractive index delta $\Delta 1_{MAX}$. The outer annular portion 60 has a refractive index profile $\Delta 4(r)$ with a maximum relative refractive index $\Delta 4_{MAX}$, and a minimum relative refractive index $\Delta 4_{MIN}$, where in some embodiments $\Delta 4_{MAX} = \Delta 4_{MIN}$. Preferably, the core is doped with germania and contains substantially no fluorine, more preferably the core contains no fluorine.

The numerical aperture (NA) of the optical fiber is preferably greater than the NA of the optical source directing signals into the fiber; for example, the NA of the optical fiber is preferably greater than the NA of a VCSEL source.

If desired, a hermetic coating of carbon can be applied to the outer glass surface of the fibers disclosed herein. The coating may have a thickness less than about 100 angstroms. At least one, and preferably two (a soft primary and a harder secondary coating) protective polymer coatings may be applied over the carbon coating. The use of such a carbon coating results in improved dynamic fatigue resistance, e.g., using such coatings, dynamic fatigue constants greater than 50, more preferably greater than 100 are achievable, and 15% Weibull failure probabilities greater than 400 kpsi are achievable.

Set forth below in Table 1 are refractive index parameters and modeled optical properties of a variety of examples. Examples 1-6 exhibit refractive index profiles similar to those illustrated by FIG. 3. Examples 7 and 8 exhibit refractive index profiles similar to those illustrated by FIG. 1. In particular, provided below are delta 1 of core region 20, outer radius R1 of core region 20, alpha of core region 20, $\Delta 2$ of inner annular region 30, outer radius R2 and width W2 of inner annular region 30, $\Delta 3$ of depressed index cladding region 50, outer radius R3 of depressed index cladding region 50, profile volume V3 of depressed index cladding region 50. Clad radius is the outermost radius of the fiber ($R_4$) as well as the outer radius of the outer annular glass cladding portion 60. Also provided is the numerical aperture NA of the fiber and the product of the numerical aperture and the core diameter (NA*CD). NA*CD may preferably be greater than 20 μm, and more preferably greater than 22 μm. In some embodiments NA*CD is less than 30 μm. The outer glass cladding diameter is in some embodiments less than 120 microns, preferably less than 110 microns. By also including a titania outer cladding portion 70 to each of the fibers below, for example at compositional amount of about 5 wt percent for a width of about 5 microns (e.g., the outermost 5 microns of the fiber, these fibers will also exhibit dynamic fatigue values higher than 25, 30, and even 40.

mary and secondary coatings are applied over the first relatively hard protective layer described above. In such embodiments, the first relatively hard protective layer preferably exhibits a strong adhesion that enables the primary and secondary coatings to be easily stripped therefrom, leaving

TABLE 1

| | Example | | | | | | | |
|---|---|---|---|---|---|---|---|---|
| | 1 | 2 | 3 | 4 | 5 | 6 | 7 | 8 |
| Delta1 (%) | 1.6 | 1.8 | 1.9 | 2 | 1.9 | 1.95 | 2.2 | 2.4 |
| R1 (mm) | 40 | 40 | 40 | 40 | 40 | 40 | 35 | 40 |
| Alpha | 2.05 | 2.03 | 2.08 | 2.1 | 2 | 2.07 | 2.06 | 2.06 |
| Delta2 (%) | | | | | | | 0 | 0 |
| R2 (mm) | | | | | | | 36 | 41 |
| W2 (mm) | | | | | | | 1 | 1 |
| Delta3 (%) | −0.45 | −0.45 | −0.5 | −0.5 | −0.5 | −0.5 | −0.55 | −0.6 |
| R3 (mm) | 45 | 45 | 45 | 45 | 45 | 46 | 45 | 46 |
| V3 (%-sq. mm) | −191 | −191 | −213 | −213 | −213 | −258 | −401 | −261 |
| Clad Radius | 50 | 50 | 50 | 50 | 45 | 45 | 50 | 50 |
| NA | 0.264 | 0.281 | 0.289 | 0.296 | 0.289 | 0.293 | 0.312 | 0.326 |

The dynamic fatigue factor, n, for fibers disclosed herein is preferably greater than 25, more preferably greater than 30 and even more preferably greater than 35.

The fibers disclosed herein may have a variety of protective coatings 210 applied onto the outer glass cladding. For example, the protective coating 210 may include a first relatively hard protective coating thereon. For example, the coating may be a cured polymeric layer which when cured exhibits a Shore D hardness of greater than 50, 55, 60, or 65. Examples of such materials may be found, for example, in U.S. Pat. No. 4,973,129, the entire specification of which is hereby incorporated by reference. Alternatively, the relatively hard coating may be applied as an hermetic carbon coating. The first relatively hard coating layer may be applied at a thickness which is sufficient to result in an outer thickness of between about 120 and 130 microns, more preferably between about 124 and 126 microns.

If desired, conventional primary and secondary coatings may optionally be applied over the first hard protective coating. The primary coating serves as a buffer to cushion and protect the glass fiber core when the fiber is bent, cabled, or spooled; but it also protects the glass surface from water adsorption, which can promote crack growth and increase static fatigue that result in failure. The secondary coating is applied over the primary coating and functions as a tough, protective outer layer that prevents damage to the glass fiber during processing and use. For example, the primary coating may have a Young's modulus of about 0.1 to about 3 MPa and/or a $T_g$ of about −100° C. to about −25° C. As used herein, the Young's modulus of a cured primary or second intermediate coating material is measured using a pull-out type in situ modulus test as described in Steeman et al., "Mechanical Analysis of the in-situ Primary Coating Modulus Test for Optical Fibers," in *Proc. of the 52$^{nd}$ International Wire and Cable Symposium* (IWCS, Philadelphia, USA, Nov. 10-13, 2003), Paper 41. A number of suitable primary coatings are disclosed, for example, in U.S. Pat. Nos. 6,326,416 to Chien et al., 6,531,522 to Winningham et al., 6,539,152 to Fewkes et al., 6,563,996 to Winningham, 6,869,981 to Fewkes et al., 7,010,206 and 7,221,842 to Baker et al., and 7,423,105 to Winningham, each of which is incorporated herein by reference in its entirety. In some embodiments, conventional primary and secondary coatings are applied over the first relatively hard protective layer described above. In such embodiments, the first relatively hard protective layer preferably exhibits a strong adhesion that enables the primary and secondary coatings to be easily stripped therefrom, leaving the 125 micron diameter first protective layer for insertion into a connector or other component capable of receiving a 125 micron optical fiber.

Suitable primary coating compositions include, without limitation, about 25 to 75 weight percent of one or more urethane acrylate oligomers; about 25 to about 65 weight percent of one or more monofunctional ethylenically unsaturated monomers; about 0 to about 10 weight percent of one or more multifunctional ethylenically unsaturated monomers; about 1 to about 5 weight percent of one or more photoinitiators; about 0.5 to about 1.5 pph of one or more antioxidants; about 0.5 to about 1.5 pph of one or more adhesion promoters; and about 0.01 to about 0.5 pph of one or more stabilizers.

Other suitable primary coating compositions include about 52 weight percent polyether urethane acrylate (BR 3741 from Bomar Specialties Company), between about 40 to about 45 weight percent of polyfunctional acrylate monomer (Photomer 4003 or Photomer 4960 from Cognis), between 0 to about 5 weight percent of a monofunctional acrylate monomer (caprolactone acrylate or N-vinylcaprolactam), up to about 1.5 weight percent of a photoinitiator (Irgacure 819 or Irgacure 184 from Ciba Specialty Chemical, LUCIRIN® TPO from BASF, or combination thereof), to which is added about 1 pph adhesion promoter (3-acryloxypropyltrimethoxysilane), about 1 pph antioxidant (Irganox 1035 from Ciba Specialty Chemical), optionally up to about 0.05 pph of an optical brightener (Uvitex OB from Ciba Specialty Chemical), and optionally up to about 0.03 pph stabilizer (pentaerythritol tetrakis(3-mercaptoproprionate) available from Sigma-Aldrich).

Exemplary primary coating compositions include, without limitation, the following formulations:

(1) 52 weight percent polyether urethane acrylate oligomer (BR 3741, Bomar Specialty), 40 weight percent ethoxylated(4) nonylphenol acrylate (Photomer 4003, Cognis Corp.), 5 weight percent N-vinyl pyrollidinone, 1.5 weight percent bis(2,4,6-trimethyl benzoyl)phenyl-phosphine oxide (Irgacure 819, Ciba Specialty), 1.5 weight percent 1-hydroxycyclohexylphenyl ketone (Irgacure 184, Ciba Specialty), 1 pph thiodiethylene bis(3,5-di-tert-butyl)-4-hydroxyhydrocinnamate (Irganox 1035, Ciba Specialty), and 1 pph 3-acryloxypropyltrimethoxysilane;

(2) 52 weight percent polyether urethane acrylate oligomer (BR 3741, Bomar Specialty), 40 weight percent ethoxylated(4) nonylphenol acrylate (Photomer 4003, Cognis Corp.), 5 weight percent N-vinyl caprolactam, 1.5 weight percent bis(2,4,6-trimethyl benzoyl)phenyl-phosphine oxide (Irgacure 819, Ciba Specialty), 1.5 weight percent 1-hydroxycyclohexylphenyl ketone (Irgacure 184, Ciba Specialty), 1 pph thiodiethylene bis(3,5-di-tert-butyl)-4-hydroxyhydrocinnamate (Irganox 1035, Ciba Specialty), and 1 pph 3-acryloxypropyltrimethoxysilane;

(3) 52 weight percent polyether urethane acrylate oligomer (BR3731, Sartomer Co.), 45 weight percent ethoxylated(4) nonylphenol acrylate (SR504, Sartomer Co.), 3 weight percent (2,6-dimethoxybenzoyl)-2,4,4-trimethylpentyl phosphine oxide (Irgacure 1850, Ciba Specialty), 1 pph thiodiethylene bis(3,5-di-tert-butyl)-4-hydroxyhydrocinnamate (Irganox 1035, Ciba Specialty), 1 pph bis(trimethoxysilylethyl)benzene adhesion promoter, and 0.5 pph polyalkoxypolysiloxane carrier (Tegorad 2200, Goldschmidt); and (4) 52 weight percent polyether urethane acrylate oligomers (BR3731, Sartomer Co.), 45 weight percent ethoxylated(4) nonylphenol acrylate (Photomer 4003, Cognis Corp.), 3 weight percent (2,6-dimethoxybenzoyl)-2,4,4-trimethylpentyl phosphine oxide (Irgacure 1850, Ciba Specialty), 1 pph thiodiethylene bis(3,5-di-tert-butyl)-4-hydroxyhydrocinnamate (Irganox 1035, Ciba Specialty), 1 pph bis(trimethoxysilylethyl)benzene adhesion promoter, and 0.5 pph tackifier (Unitac R-40, Union Camp);

(5) 52 weight percent polyether urethane acrylate oligomers (BR3731, Sartomer Co.), 45 weight percent ethoxylated-nonylphenol acrylate (SR504, Sartomer Co.), and 3 weight percent (2,6-dimethoxybenzoyl)-2,4,4-trimethylpentyl phosphine oxide (Irgacure 1850, Ciba Specialty); and (6) 52 weight percent urethane acrylate oligomer (BR3741, Bomar), 41.5 weight percent ethoxylated nonyl phenol acrylate monomer (Photomer 4003, Cognis), 5 weight percent caprolactone acrylate monomer (Tone M-100, Dow), 1.5 weight percent Irgacure 819 photoinitiator (Ciba), 1 pph thiodiethylene bis(3,5-di-tert-butyl)-4-hydroxyhydrocinnamate (Irganox 1035, Ciba Specialty), 1 pph 3-acryloxypropyltrimethoxysilane (Gelest), and 0.032 pph pentaerythritol tetrakis (3-mercaptopropionate) (Aldrich).

The secondary coating material is typically the polymerization product of a coating composition that contains urethane acrylate liquids whose molecules become highly crosslinked when polymerized. Secondary coating has a high Young's modulus (e.g., greater than about 0.08 GPa at 25° C.) and a high $T_g$ (e.g., greater than about 50° C.). The Young's modulus is preferably between about 0.1 GPa and about 8 GPa, more preferably between about 0.5 GPa and about 5 GPa, and most preferably between about 0.5 GPa and about 3 GPa. The $T_g$ is preferably between about 50° C. and about 120° C., more preferably between about 50° C. and about 100° C. The secondary coating has a thickness that is less than about 40 µm, more preferably between about 20 to about 40 µm, most preferably between about 20 to about 30 µm.

Other suitable materials for use as secondary coating materials, as well as considerations related to selection of these materials, are well known in the art and are described in U.S. Pat. Nos. 4,962,992 and 5,104,433 to Chapin, each of which is hereby incorporated by reference in its entirety. As an alternative to these, high modulus coatings have also been obtained using low oligomer content and low urethane content coating systems, as described in U.S. Pat. Nos. 6,775,451 to Botelho et al., and 6,689,463 to Chou et al., each of which is hereby incorporated by reference in its entirety. In addition, non-reactive oligomer components have been used to achieve high modulus coatings, as described in U.S. Application Publ No. 20070100039 to Schissel et al., which is hereby incorporated by reference in its entirety. Outer coatings are typically applied to the previously coated fiber (either with or without prior curing) and subsequently cured, as will be described in more detail hereinbelow. Various additives that enhance one or more properties of the coating can also be present, including antioxidants, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Suitable outer coating compositions include, without limitation, about 0 to 20 weight percent of one or more urethane acrylate oligomers; about 75 to about 95 weight percent of one or more monofunctional ethylenically unsaturated monomers; about 0 to about 10 weight percent of one or more multifunctional ethylenically unsaturated monomers; about 1 to about 5 weight percent of one or more photoinitiators; and about 0.5 to about 1.5 pph of one or more antioxidants.

Other suitable outer coating compositions include, without limitation, about 10 weight percent of a polyether urethane acrylate oligomer (KWS 4131 from Bomar Specialty Co.), about 72 to about 82 weight percent ethoxylated (4) bisphenol A diacrylate monomer (Photomer 4028 from Cognis), about 5 weight percent bisphenol A diglycidyl diacrylate (Photomer 3016 from Cognis), optionally up to about 10 weight percent of a diacrylate monomer (Photomer 4002 from Cognis) or N-vinylcaprolactam, up to about 3 weight percent of a photoinitiator (Irgacure 184 from Ciba Specialty Chemical, or Lucirin® TPO from BASF, or combination thereof), to which is added about 0.5 pph antioxidant (Irganox 1035 from Ciba Specialty Chemical).

Exemplary outer coating compositions include, without limitation, the following formulations:

(1) 40 weight percent urethane acrylate oligomer (CN981, Sartomer Company, Inc.), 17 weight percent propoxylated (3) glyceryl triacrylate monomer (SR9020, Sartomer Inc.), 25 weight percent pentaerythritol tetraacrylate (SR295, Sartomer Inc.), 15 weight percent ethoxylated(2) bisphenol A diacrylate monomer (SR349, Sartomer Inc.), and 3 weight percent of 1-hydroxycyclohexyl phenyl ketone and bis(2,6-dimethoxybenrzoyl)-2,4,4-trimethylpentyl phosphine oxide blend (Irgacure 1850, Ciba Specialty Chemical); and (2) 10 weight percent polyether urethane acrylate (KWS 4131, Bomar), 5 weight percent bisphenol A diglycidyl diacrylate (Photomer 3016, Cognis), 82 weight percent ethoxylated (4) bisphenol A diacrylate (Photomer 4028, Cognis), 1.5 weight percent Lucirin TPO photoinitiator (BASF), 1.5 weight percent 1-hydroxycyclohexylphenyl ketone (Irgacure 184, Ciba), and 0.5 pph thiodiethylene bis(3,5-di-tert-butyl-4-hydroxy)hydrocinnamate antioxidant (Irganox 1035, Ciba Specialty Chemical).

The first intermediate coating 15 is typically the polymerization product of a coating composition that affords a relatively higher Young's modulus and a relatively higher $T_g$ as compared to the Young's modulus and $T_g$ of the primary coating. The Young's modulus is preferably between about 0.1 GPa and about 2 GPa, more preferably between about 0.2 GPa and about 1 GPa, and most preferably between about 0.3 GPa and about 1 GPa. The $T_g$ is preferably between about 0° C. and about 60° C., more preferably between about 10° C. and about 60° C., most preferably between about 10° C. and about 50° C. The first intermediate coating has a thickness that is less than about 25 µm, more preferably less than about 20 μm, even more preferably less than about 15 μm, and most preferably in the range of about 5 μm to about 10 μm.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A multimode optical fiber comprising:
a graded index core comprising a core refractive index delta percent $\Delta_1$, said core comprising a core radius greater than 30 microns; and
a depressed index cladding region surrounding said core and comprising refractive index delta percent $\Delta_3$, wherein $\Delta_3$ is less than about −0.1% and said depressed region has a width of at least 1 micron, wherein $\Delta_1 > \Delta_3$, and a titania doped cladding region surrounding the depressed index cladding region, said fiber comprises a total outer diameter of less than 120 microns, and said fiber exhibits an overfilled bandwidth at 850 nm greater than 200 MHz-km.

2. The multimode fiber of claim 1, wherein said fiber is comprised of glass, wherein said outer cladding region comprises titania in an amount greater than 5 wt percent.

3. The multimode fiber of claim 2, wherein said depressed index cladding region is directly adjacent the core and has a refractive index delta less than about −0.2% and a width of at least 2 microns, and the titania doped region has a width of between 1 and 5 microns.

4. The multimode fiber of claim 2, further comprising an inner cladding region comprising $\Delta_2$, wherein said inner cladding region surrounds said core and said depressed cladding region surrounds said inner cladding region, wherein $\Delta_1 > \Delta_2 > \Delta_3$, and said inner cladding region is less than 4 microns wide.

5. The multimode fiber of claim 2, wherein said core comprises a core radius greater than 35 microns.

6. The multimode fiber of claim 5, wherein said fiber is comprised of glass, said core comprises a glass core radius less than 45 microns, and said total outer glass diameter is less than 110 microns.

7. The multimode fiber of claim 1, wherein said fiber exhibits an overfilled bandwidth at 850 nm which is greater than 500 MHz-km.

8. The fiber of claim 1, wherein said fiber further exhibits a 1×180° turn 3 mm diameter mandrel wrap attenuation increase, of less than or equal to 1.0 dB at 850 nm.

9. The fiber of claim 1, wherein said fiber further exhibits a 1×180° turn 3 mm diameter mandrel wrap attenuation increase, of less than or equal to 0.5 dB at 850 nm.

10. The fiber of claim 1, wherein said fiber further exhibits a 1×180° turn 3 mm diameter mandrel wrap attenuation increase, of less than or equal to 0.3 dB/turn at 850 nm.

11. The fiber of claim 1, wherein said depressed-index annular portion has a width less than 8 microns.

12. The multimode fiber of claim 1, wherein said fiber exhibits a numerical aperture greater than 0.24.

13. A multimode optical fiber comprising:
a graded index core having a radius greater than 35 microns; and
a first inner cladding comprising a depressed-index annular portion, said depressed-index annular portion having a refractive index delta less than about −0.2% and a width of at least 1 micron, and a titania doped cladding region surrounding depressed index cladding region, and said fiber further exhibits a 1×180° turn 3 mm diameter mandrel wrap attenuation increase, of less than or equal to 0.5 dB at 850 nm, and an overfilled bandwidth greater than 200 MHz-km at 850 nm.

14. The multimode fiber of claim 13, wherein said fiber is comprised of glass, wherein said outer cladding region comprises titania in an amount greater than 5 wt percent.

15. The multimode fiber of claim 14, wherein said fiber is comprised of glass, and wherein the outer glass diameter of said fiber is less than 120 microns.

16. The multimode fiber of claim 14, wherein said fiber further exhibits an overfilled bandwidth greater than 500 MHz-km at 850 nm.

17. The multimode fiber of claim 14 further comprising a numerical aperture of greater than 0.26.

18. The multimode fiber of claim 14 further comprising a numerical aperture of greater than 0.28.

19. The multimode fiber of claim 14, wherein said fiber exhibits a 15% Weibull failure probability greater than 400 kpsi.

20. The multimode fiber of claim 19, further comprising a dynamic fatigue constant greater than 30.

21. The multimode fiber of claim 19, further comprising a dynamic fatigue constant greater than 35.

22. The multimode fiber of claim 1, further comprising a coating thereon having a Shore D hardness of greater than 50, said coating having an outer diameter between 120 and 130 microns.

* * * * *